UNITED STATES PATENT OFFICE.

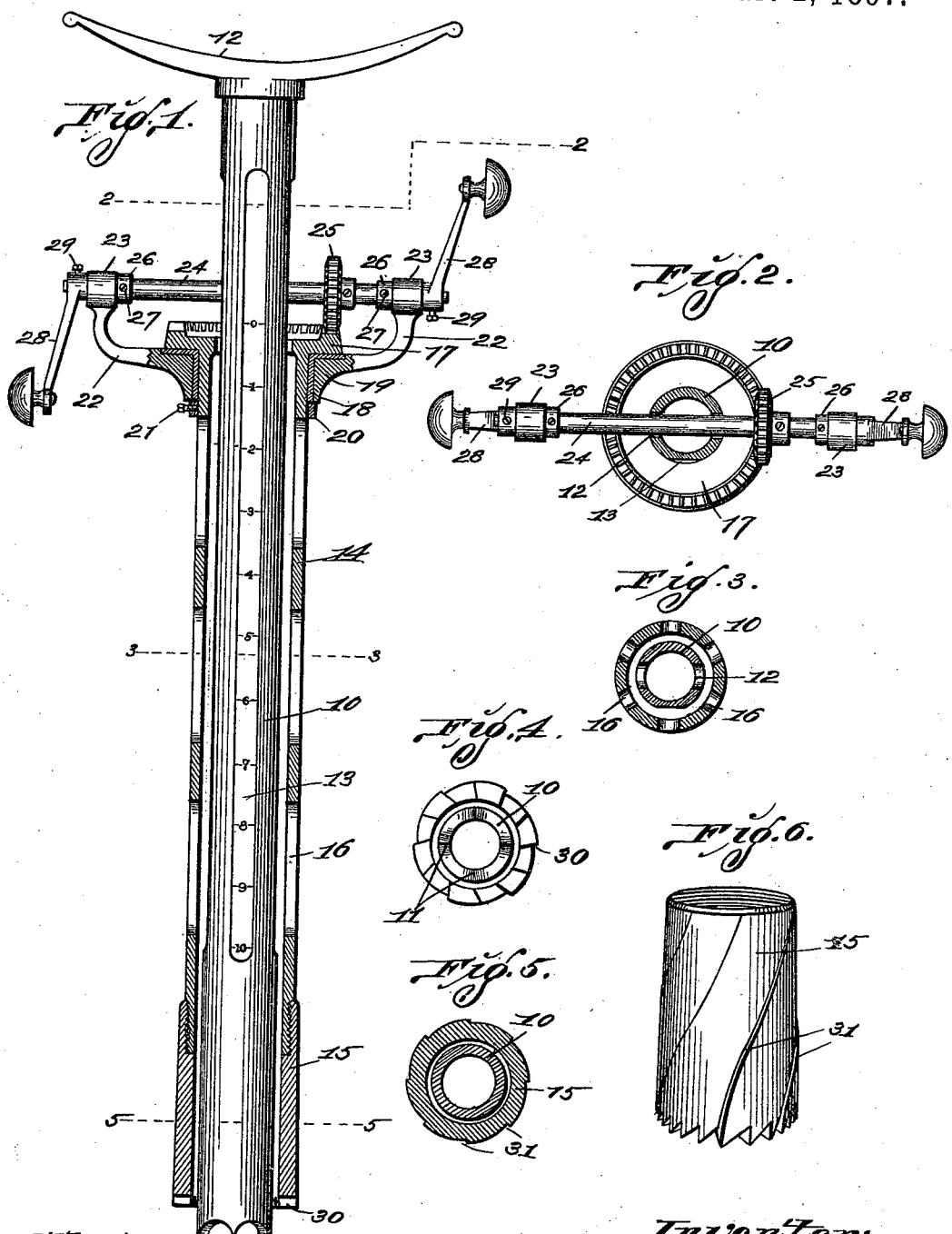

HANNING A. CARLSON, OF ST. LOUIS, MISSOURI.

HOLLOW AUGER.

SPECIFICATION forming part of Letters Patent No. 578,209, dated March 2, 1897.

Application filed September 14, 1896. Serial No. 605,736. (No model.)

*To all whom it may concern:*

Be it known that I, HANNING A. CARLSON, of the city of St. Louis, State of Missouri, have invented certain new and useful Improvements in Hollow Augers, of which the following is a full, clear, and exact description, reference being had to the accompanying drawings, forming a part hereof.

My invention relates to hollow augers; and it consists in the novel construction, combination, and arrangement of parts hereinafter shown, described, and claimed.

One of the principal objects of my invention is to bore around the spike or bolt when it is desired to remove the spike or bolt from the timber after it has become rusted or set in position and cannot be removed in any other way.

A further object of my invention is to bore a hole by cutting around the disk and then removing the disk integral.

The other objects to which my invention is applicable will be obvious to those familiar with the use of a hollow auger.

Figure 1 is a view in elevation, partly in section, of my improved hollow auger. Fig. 2 is a horizontal sectional view taken approximately on the line 2 2 of Fig. 1. Fig. 3 is a horizontal sectional view taken approximately on the line 3 3 of Fig. 1. Fig. 4 is a bottom plan view of the parts shown in Fig. 1. Fig. 5 is a horizontal sectional view taken approximately on the line 5 5 of Fig. 1. Fig. 6 is a view in perspective of the cutting-head of which I make use.

In the construction of my improved hollow auger I employ the non-rotatable center piece 10, which consists of a pipe having the teeth 11 upon its lower end and the horizontal concaved plate 12 attached to its upper end. It is not essential that the center piece 10 should be hollow, and the only object in making it such is to make it light, strong, and easy of construction.

The longitudinally-extending slots 12 are formed in opposite sides of the pipe and extend about two-thirds of the length thereof. Upon the front side of the center piece is a flat surface, upon which is a graduated scale 13.

A cylindrical shell 14 is placed upon the center piece, and the lower end of said shell is screw-threaded to receive the screw-threaded end of the cutting-head 15. The shell 14 has a slot 16 formed through its wall for the purpose of reducing its weight, and upon the upper end of the shell 14 is attached a horizontal gear 17, having teeth upon its upper face.

A brass bushing 18 surrounds the shell 14 and engages the lower face of the gear 17 in such a way that the shell 14 may rotate within said bushing. A collar 19 surrounds the bushing 18 and is fixed to said bushing. A collar 20 is placed upon the shell 14 from the lower end and is adjustably held against the lower end of the bushing 18 and the lower side of the collar 19 by means of a set-screw 21. The arms 22 project outwardly and upwardly from opposite sides of the collar 19, and in their upper ends are formed the horizontally-alined bearings 23, in which bearings is mounted the shaft 24. A vertical gear 25 is mounted upon the shaft 24 and has teeth upon its periphery and engaging the teeth of the gear 17. The collars 26 are placed upon the shaft 24 and engage the inner faces of the bearings 23, and said collars are held adjustably in position by means of the set-screws 27.

The operating-handles 28 are mounted upon and fixed to the outer ends of the shaft 24, and the set-screws 29 hold said handles in the desired positions relative to each other and to the shaft. The shaft 24 is rotated by the operation of the handles 28, thus rotating the gear 25, and the gear 17 is rotated by meshing with the gear 25, thus rotating the shell 14 and the cutter-head 15.

Upon the lower end of the cutting-head 15 are the cutting edges 30, and extending spirally upwardly from said cutting edges and upon the outer surface of the cutting-head are the ribs 31, designed to force the shavings made by the cutting edges upwardly and out of the auger-hole.

In repairing or breaking up boats it frequently becomes necessary to remove spikes and bolts from planks in which they have become firmly seated through rust and other causes, and such spikes or bolts may be readily removed by the use of my invention.

The teeth 11 upon the center piece are placed upon the head of the spike or the end of the bolt and are held firmly in position against said spike or bolt by the pressure of the chest of the operator against the plate 12. Then by operating the handles 28 the cutting-head 15 is rotated, and by the operation of the cutting edges 30 the timber is cut away concentrically around the spike or bolt, after which said spike or bolt may be readily removed from its position.

Assuming that the auger is to be used to remove a spike the head of which is on a level with the face of the timber, then when the teeth 11 are placed upon the head of the spike and the cutting edges 30 are placed against the face of the timber the center of the shaft 24 will be in horizontal alinement with the mark upon the scale 13, which mark is indicated by "0." Then the operator by noticing the position of the shaft 24 relative to the scale 13 can tell at any moment the distance the cutting edge 30 has gone below the teeth 11. The cutting edges 30 are held against the timber by the pressure downwardly upon the handles 28. By setting the teeth 11 into the timber and operating the auger, as before described, the timber will be cut away around the disk, and said disk may then be removed, thus forming an auger-hole through the timber. In like manner my improved auger may be used as a spoke-auger and for various other purposes for which a hollow auger is suitable.

I claim—

1. In a hollow auger, a non-rotatable center piece having a longitudinal slot through its center, means of operating said center piece, a shell rotatably and slidingly mounted upon said center piece, cutting edges upon the lower end of said center piece, a collar loosely mounted upon the upper end of said shell, a gear upon the upper end of said shell and above said collar, arms projecting in opposite directions from said collar outwardly and upwardly, alined bearings in the upper ends of said collar, a shaft mounted in said bearings and extending through said slot in said center piece, a gear upon said shaft and meshing with the gear upon said shell, and operating-handles upon said shaft, substantially as specified.

2. In a hollow auger, a non-rotatable center piece having a longitudinal slot through its center, teeth upon the lower end of said center piece, an operating-handle upon the upper end of said center piece, a shell rotatably and slidingly mounted upon said center piece, a collar loosely mounted upon the upper end of said shell, a gear upon the upper end of said shell and above said collar, alined bearings attached to said collar, a shaft mounted in said bearings and extending through said slot in said center piece, a gear upon said shaft and meshing with the gear upon said shell, and means of operating said shaft, substantially as specified.

3. In a hollow auger, a non-rotatable center piece having a longitudinal slot through its center, an operating-handle upon the upper end of said center piece, teeth upon the lower end of said center piece, a shell rotatably and slidingly mounted upon said center piece, a gear upon the upper end of said shell, bearings alined with each other and with said shell, a shaft mounted in said bearings and extending through said slot in said center piece, a gear upon said shaft and meshing with the gear upon said shell, and operating-handles upon said shaft, substantially as specified.

In testimony whereof I affix my signature in presence of two witnesses.

HANNING A. CARLSON.

Witnesses:
M. E. SPILLMAN,
MAUD GRIFFIN.